(12) United States Patent
Buck et al.

(10) Patent No.: US 7,264,177 B2
(45) Date of Patent: Sep. 4, 2007

(54) METHODS, SYSTEMS AND APPARATUSES FOR AUTOMATED IRRIGATION AND CHEMICAL TREATMENT

(75) Inventors: David Aaron Buck, Little Elm, TX (US); Thomas Daniel Storey, McKinney, TX (US); Richard David Buck, Frisco, TX (US)

(73) Assignee: Intelligent Lawn Systems, L.P., Little Elm, TX (US)

( * ) Notice: Subject to any disclaimer, the term of this patent is extended or adjusted under 35 U.S.C. 154(b) by 421 days.

(21) Appl. No.: 10/910,435

(22) Filed: Aug. 3, 2004

(65) Prior Publication Data

US 2006/0027676 A1 Feb. 9, 2006

(51) Int. Cl.
| B12B 12/08 | (2006.01) |
| B15B 15/10 | (2006.01) |
| B07B 7/26 | (2006.01) |
| A01G 25/00 | (2006.01) |
| A01G 27/00 | (2006.01) |
| G05D 7/00 | (2006.01) |
| G05D 11/00 | (2006.01) |

(52) U.S. Cl. ............................ 239/63; 239/10; 239/67; 239/69; 239/201; 239/203; 239/305; 239/307; 239/310; 239/321; 239/407; 239/413; 239/DIG. 15; 137/78.3; 700/284

(58) Field of Classification Search .................. 239/63, 239/10, 67, 69, 201, 203, 303, 305, 307, 239/310, 321, 407, 413, DIG. 15, 64, 66, 239/70, 71, 200, 204, 205, 207, 304, 320, 239/322, 398, 427.3, 427.5, 427, 536, 550, 239/565; 700/284, 283; 137/78.3, 78.2, 137/93; 251/129.14

See application file for complete search history.

(56) References Cited

U.S. PATENT DOCUMENTS

| 3,114,243 | A | | 12/1963 | Winters |
| 4,209,131 | A | | 6/1980 | Barash et al. |
| 4,396,149 | A | | 8/1983 | Hirsch |
| 4,545,396 | A | | 10/1985 | Miller et al. |
| 4,646,224 | A | | 2/1987 | Ransburg et al. |
| 4,768,712 | A | * | 9/1988 | Terrell ........................ 239/68 |
| 4,838,310 | A | | 6/1989 | Scott et al. |
| 4,852,802 | A | | 8/1989 | Iggulden et al. |
| 4,867,192 | A | | 9/1989 | Terrell et al. |
| 4,875,498 | A | * | 10/1989 | Andrews et al. ........... 137/78.3 |
| 4,895,303 | A | | 1/1990 | Freyvogel |
| 4,917,304 | A | | 4/1990 | Mazzei et al. |
| 5,021,939 | A | | 6/1991 | Pulgiese |

(Continued)

Primary Examiner—Joseph A. Kaufman
Assistant Examiner—Darren Gorman
(74) Attorney, Agent, or Firm—Gardere Wynne Sewell

(57) ABSTRACT

An automated irrigation and chemical treatment system comprising a user input device adapted to communicate with a control unit; a mixing chamber adapted to communicate with the control unit and connected to a water supply and chemical canisters, wherein each canister has a sensor to monitor fluid level therein, and control valves for connecting the mixing chamber to a network of pipes. Sprinkler heads connected to the network of pipes each include, a control valve adapted to control fluid flow to a water delivery nozzle by an electro magnet controlled rubber coated ferric ball closure member. The sprinkler heads include water and chemical saturation sensors and the sprinkler heads also communicate with the control unit via wireless transceivers. Multiple zones covered by the system may be treated according to predetermined schedules.

38 Claims, 7 Drawing Sheets

U.S. PATENT DOCUMENTS

| | | | |
|---|---|---|---|
| 5,022,585 A * | 6/1991 | Burgess | 239/70 |
| 5,135,174 A | 8/1992 | Chaplinsky | |
| 5,193,744 A | 3/1993 | Goldstein | |
| 5,278,749 A | 1/1994 | De Man | |
| 5,333,785 A | 8/1994 | Dodds et al. | |
| 5,427,350 A | 6/1995 | Rinkewich | |
| 5,445,176 A | 8/1995 | Goff | |
| 5,740,031 A | 4/1998 | Gagnon | |
| 5,813,606 A | 9/1998 | Ziff | |
| 5,813,655 A | 9/1998 | Pinchott et al. | |
| 5,816,502 A * | 10/1998 | Sperry et al. | 239/304 |
| 5,839,660 A | 11/1998 | Morgenstern et al. | |
| 6,016,971 A | 1/2000 | Welch et al. | |
| 6,076,740 A | 6/2000 | Townsend | |
| 6,095,189 A * | 8/2000 | Ben-Shalom | 137/606 |
| 6,098,898 A | 8/2000 | Storch | |
| 6,108,590 A | 8/2000 | Hergert | |
| 6,314,979 B1 | 11/2001 | Lips | |
| 6,453,215 B1 | 9/2002 | Lavoie | |
| 6,685,104 B1 * | 2/2004 | Float et al. | 239/63 |
| 6,874,707 B2 * | 4/2005 | Skinner | 239/542 |
| 6,994,271 B2 * | 2/2006 | Tarara et al. | 239/67 |
| 7,097,113 B2 * | 8/2006 | Ivans | 239/1 |

* cited by examiner

METHODS, SYSTEMS AND APPARATUSES FOR AUTOMATED IRRIGATION AND CHEMICAL TREATMENT

BACKGROUND

The present invention relates to the general field of irrigation and lawn care systems, and in particular, to automated irrigation and chemical treatment systems.

Irrigation systems for residential and commercial applications, known in the art, often include a centralized control switch that triggers watering during specified time frames. Some systems lack the ability to gauge whether the subject field is already saturated before irrigation begins. Thus, these systems fail to conserve water and often times over saturate the subject field and foster unfavorable and sometime harmful conditions, such as disease or molding. Other systems lack the ability to gauge whether the subject field has been adequately saturated after distributing water. Often times, these systems fail to provide the subject field with enough water, leaving the field to dry out and eventually die. What is needed is an irrigation system that automatically allocates water, only if necessary, after assessing current soil conditions.

There are still other systems known in the art which use a computerized irrigation system to collect data from different zones of a field. These systems collect data, such as wind speed, temperature and humidity and analyze the data to deliver a customized amount of water to each zone. Similar systems known in the art disclose a sprinkler control system that generally monitors soil saturation rates by utilizing an extensive database of evapotranspiration rates of different cities. These systems unnecessarily employ a large database and assume evapotranspiration rates will remain relatively constant year to year. These systems further fail to recognize geological deviations in the land itself, including failing to recognize that some parts of the land may be more conducive to drainage than are others. Furthermore, the current systems require costly deployment mapping in order to locate and replace buried sensors. What is needed is a system that economically and efficiently integrates a plurality of sensors into an irrigation system and accounts for differences in topography and other environmental conditions.

Automated irrigation systems which include a basic chemical distribution system are also known in the art. These systems typically include computer controlled liquid fertilizer injections or pumps that add fertilizer into the water supply. Thus, these systems often end up fertilizing the entire land regardless of whether a necessity exists. What is needed is an easily programmable, automated irrigation and chemical treatment system that allocates customized amounts of water and chemicals as required.

Underground irrigation systems known in the art are operable to deploy water to large zones with a multiplicity of sprinkler heads. These sprinkler heads, which have no internal control mechanisms, act merely as flow through devices. Thus, known sprinkler heads fail to accommodate topographical gradients, existing environmental conditions and other factors within a controlling zone. What is needed is a non-mechanized, internal control mechanism that is energy efficient and controls and monitors the flow of water and chemicals through a given sprinkler head.

Accordingly, there is a need for a low cost, efficient and easy to program automated irrigation and chemical treatment system that accommodates sprinkler head level data acquisition and provides customized water and chemical delivery to individually zoned areas of a land region. There is a further need for an efficient system that strategically captures and utilizes energy from the flow of liquid and the inherent water pressure subsisting within the system. Moreover, there is a still further need to harness this energy and store it in an energy source, such as a rechargeable battery, to foster a self sustained, energy conserving system.

SUMMARY OF THE INVENTION

The present invention provides an automated irrigation and chemical treatment system operable to dispense, for example, fertilizers, herbicides and pesticides to residential and commercial land areas.

The present invention provides improvements in automated irrigation and chemical treatment systems in a low cost, efficient manner. The system of the present invention is easily programmable and accommodates sprinkler head level data acquisition to provide customized water and chemical delivery to individually zoned areas of a land region.

The system of the present invention also provides improvements in water saturation testing, proper mixing of chemicals to provide adequate lawn fertilization, weed control and pesticide application without user intervention. The system of the present invention further provides an automated system that includes, for example, a control unit, mixing chamber, sprinkler heads and valves that communicate with each other. Thus, the user of the system need not worry about "day-to-day" operations.

The system of the present invention still further provides an irrigation system which includes various chemical containers to house, for example, fertilizers, herbicides and pesticides that are eventually delivered to a zoned area at regularly scheduled intervals, or alternatively, when soil sensors indicate that a zoned area requires such chemicals. The present invention, thus, will reduce or eliminate redundant or inadequate chemical application to a zoned area while controlling unnecessary chemical pollution into water supplies and minimizing human contact with such chemicals. Accordingly, the system of the present invention reduces unnecessary water and chemical consumption, thus lowering watering and chemical treatment costs for the consumer.

The present invention still further provides an irrigation sprinkler head which includes a unique plunger system within the sprinkler head that controls the flow of water and/or other fluids out of the sprinkler head. The system of the present invention still further provides strategically placed energy capturing devices that utilize energy from the flow of liquid and the inherent water pressure subsisting within the system to charge rechargeable batteries and to drive certain parts of the system, thus, providing a self sustained, energy efficient system.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
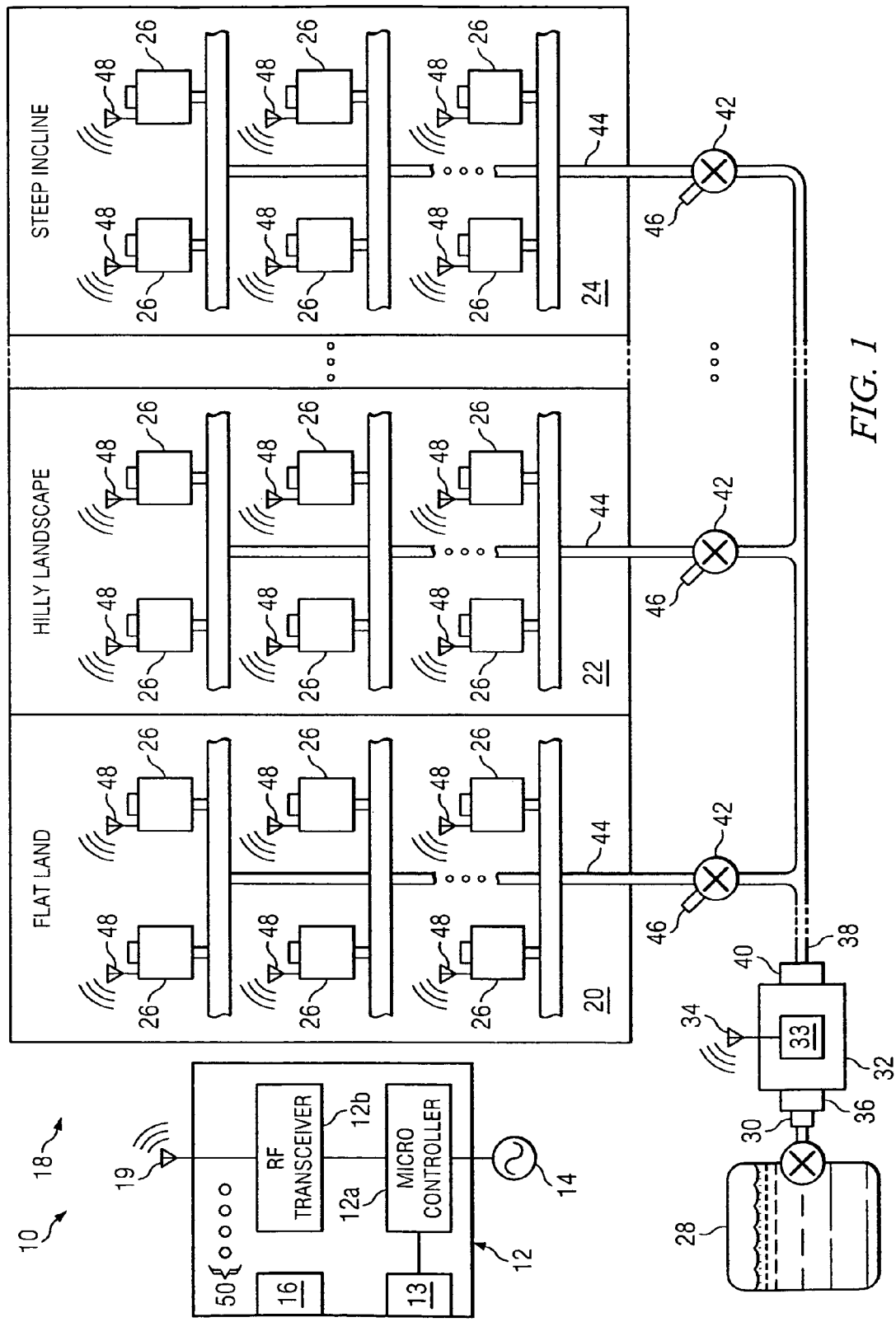
FIG. 1 is a schematic diagram of a preferred embodiment of the irrigation and chemical treatment system of the present invention.

In the description that follows, like elements are marked throughout the specification and drawings with the same reference numerals, respectively. The drawing figures are not necessarily to scale and certain elements may be shown in somewhat generalized or schematic form in the interest of clarity and conciseness. Certain routine steps, in flow charts, normally included in the operation of the present invention have been omitted in the interest of conciseness. However, the steps which include methodology in accordance with the present invention are indicated in the charts. As is conventional, the letters Y and N designate "yes" and "no", respectively.

The automated irrigation and chemical treatment system 10 of the present invention, depicted in FIG. 1, is controlled by a user programmable control unit 12 which includes a programmable micro controller 12a operably connected to a suitable wireless transmitter/receiver unit 12b. A user may program the control unit 12 via a user input device 13. The user input device 13 preferably includes, for example, one or more of the following: remote control, keypad, keyboard, connection for a telephone line or USB compatible device, an LCD display and/or accommodations for a memory stick, a smart media card, a secure digital device or any other programmable memory device.

The control unit 12 is primarily powered by an AC power source 14. The user, however, may choose to run the control unit 12 by a battery 16. Battery 16 may serve as a backup power supply if the main power and supply 14 becomes unavailable or unnecessary. The control unit 12 is adapted to wirelessly monitor an area, such as a field 18, via transceiver 12b and an antenna 19. Preferably, the field 18 has been segregated into multiple zones. For example, FIG. 1 illustrates a field 18 divided into zone 20 (flat land), zone 22 (hilly land), . . . zone 24 (steep incline). The system 10 is designed to be easily installed into new fields or may be retrofitted to existing prior art irrigation systems. For example, field 18 may already have sprinkler heads installed on it. A new and improved sprinkler head 26 of the present invention may be adapted to easily replace prior art sprinkler heads. Moreover, the user may choose to implement only certain aspects of the system 10, while eliminating others. For example, a user may choose to have some components of system 10 adapted to wirelessly communicate with the control unit 12, while choosing others to be hardwired to the control unit. System 10 is thus a fully customizable system.

The user may program the microcontroller 12a of system 10 to, for example, maintain certain water saturation levels for specific zones of a field 18. For example, if system 10 detects a water saturation level below a specified tolerance level assigned to a particular sprinkler head 26, the system 10 automatically distributes water to that sprinkler head. Similarly, the user may program system 10 to, for example, fertilize, or otherwise chemically treat, specific zones for a predetermined period of time and at predetermined intervals, such as once a month. These chemical treatments may include treatments such as fertilization, herbicides and/or pesticide applications. Alternatively, the user may decide to program system 10 to maintain a certain amount of chemical per zone. In the latter case, system 10 automatically detects the amount of chemical present in each zone. If a chemical level falls below a specified tolerance level assigned to that particular zone, the system 10 automatically distributes that chemical to that zone.

The control unit 12 generally controls the flow of liquids from a main water supply 28 throughout the system 10. Still referring to FIG. 1, the main water supply 28 connects, via an inlet connector 30, to a mixing chamber which may be provided by a body 32 comprising an enlarged diameter section of conduit, see FIG. 5. The mixing chamber 32 also may communicate with the control unit 12 by way of a hard wire connection (not shown) or, alternatively, by wireless communication via a transceiver 33 and associated antenna 34. The mixing chamber 32 also has a pressure regulator 36 to maintain constant fluid pressure throughout system 10, including, for example, the fluid pressure existing in the main water line 38 (as will be described further herein). The control unit 12 also generally controls the chemical composition of the fluid released through the outlet 40 of the mixing chamber 32 (described further herein).

The main water line 38 supplies water to plural zone pipelines 44 and subsequently to, for example, zone 20, zone 22 and zone 24 by way of respective zone valves 42, as depicted in FIG. 1. Zone valves 42 control the amount of water and/or any chemicals supplied to the zone pipelines 44, which preferably are situated underground. Each zone valve 42 may communicate with the control unit 12 by way of a hard wire connection (not shown) or, alternatively, by suitable wireless transceivers, not shown, on each valve and an antenna 46, respectively. The user may assign a set or network of zone pipelines 44 to a specific zone, for example, to zone 20, 22 or 24 in which the pipelines are connected to respective sprinkler heads 26 in each zone, as shown. Alternatively, the user may choose to strategically place each zone valve 42 such that a given zone pipeline 44 may be used as a common conduit to service two or more zones. The user may also choose to strategically assign a plurality of sprinkler heads 26 to each zone.

Figure 2:
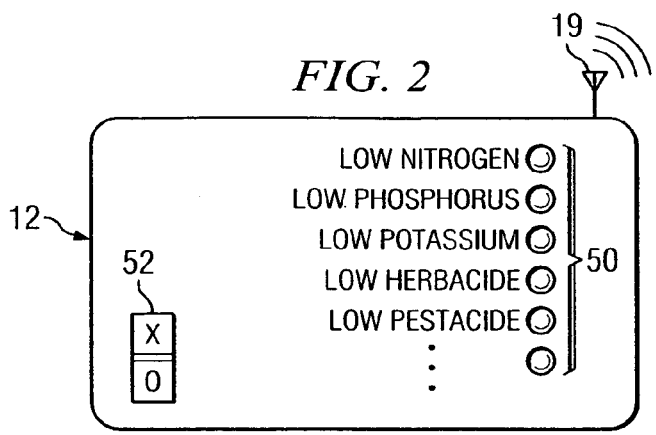
FIG. 2 is an illustration of a preferred control unit of the present invention.

Each sprinkler head 26 preferably has a sprinkler head antenna 48 that is adapted for wireless communication with the control unit 12 via suitable transmitters and receivers, not shown, in FIG. 1, associated with each sprinkler head. The control unit 12 allows the user, for example, to monitor saturation and chemical levels in the soil at least at selected ones of sprinkler heads 26. The control unit 12 preferably displays these levels visually to a user as seen in FIG. 2. For example, when water saturation or chemical levels in the soil fall below a predetermined amount, a corresponding one of light emitting diodes (LEDs) 50 is enabled. Alternatively, low saturation level information may be displayed on an output device such as an LCD display on the user input device 12, or some other output device such as a hand-held device with an LCD display. Similarly, the control unit 12 may also be configured to when chemicals in mixing chamber containers 110 (see FIG. 5) are at undesirably low levels. If at any time, the user wants or needs to manually control power to the system 10, the control unit 12 has a user accessible main power switch 52, FIG. 2.

Figure 3:
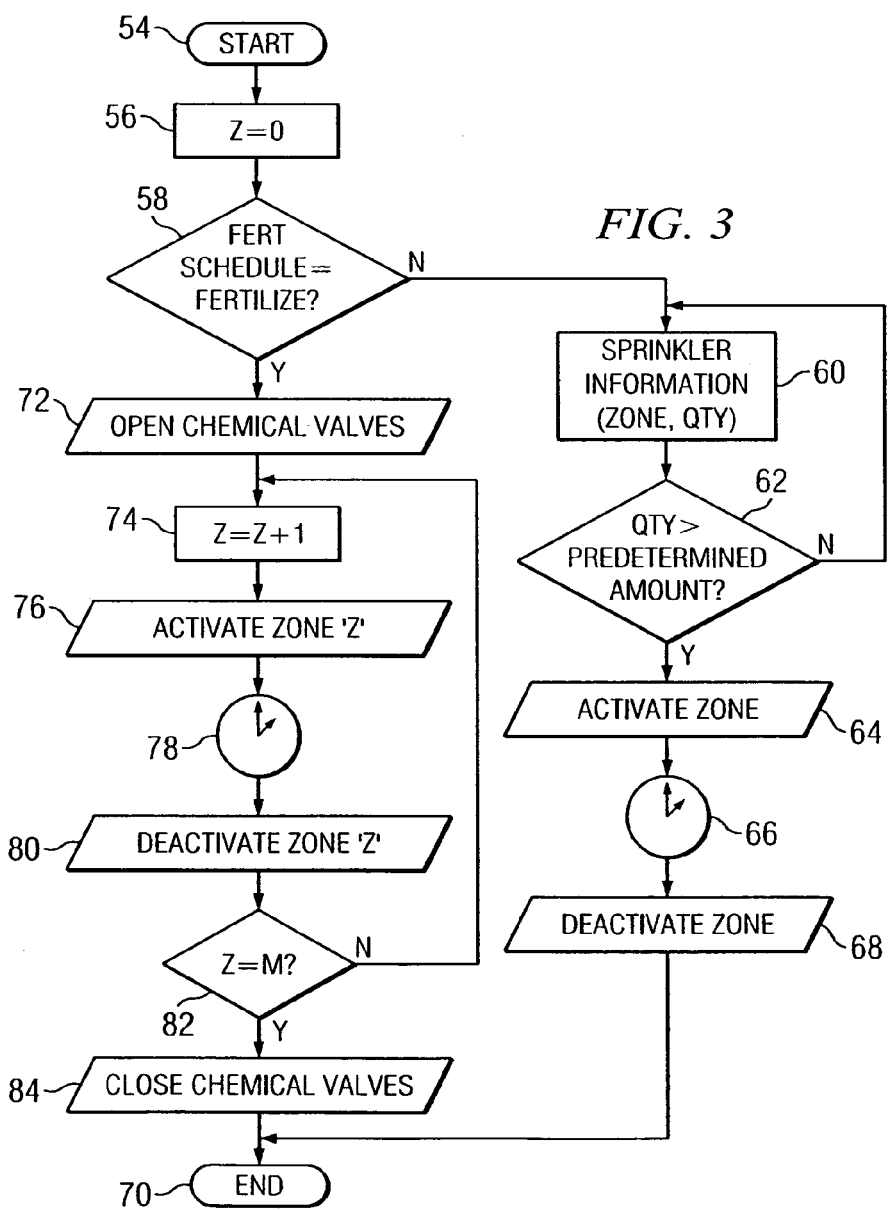
FIG. 3 is a flow chart showing operating steps of the control unit of the present invention for irrigation and chemical treatment processes.

Now referring to FIG. 3, the system 10 preferably utilizes a preprogrammed chemical treatment schedule which delivers customized amounts of chemicals to a particular zone. A user may choose to change the programmed chemical treatment schedule as is needed or elect not to have a schedule. The control unit 12, which includes programmable microcontroller 12a, FIG. 1, is operable to initially begin in step 54 and monitor each zone of field 18, beginning with an initial state in step 56. The control unit 12 checks whether a chemical treatment schedule exists in step 58.

If a chemical treatment schedule is not found in step 58, the control unit 12 assesses water saturation information gathered from each zone. Specifically, each sprinkler head 26 acquires data to determine whether saturation levels are deficient and sends that data to the control unit 12. The control unit 12 receives the data, in step 60, and stores the number of sprinkler heads 26 in that zone reporting a water saturation deficiency as a variable, for example, QTY. If QTY is greater than a predetermined number of sprinkler heads 26, in step 62, the control unit 12 sends an activation signal, in step 64, to the sprinkler heads in that zone. The user, for example, may program system 10 to activate a particular zone only if QTY is found to be more than 50% of the sprinkler heads 26 in that zone. Each individual sprinkler head 26, in turn, decides whether to allow the flow of fluid through it (as later described in conjunction with the description accompanying FIG. 7).

Still referring to FIG. 3, the activation signal remains enabled for a predetermined amount of time in step 66. After watering that zone for a specified time, the control unit 12 deactivates the zone in step 68. The control unit 12 then returns to step 60 until all zones have been checked. When the routine ends in step 70, the control unit 12 repeats the entire process and begins again at step 54. Thus, the system 10 continuously monitors saturation levels in the soil.

If a chemical treatment schedule is found in step 58, the corresponding chemical canister's 110 chemical control valve(s) 108 (see FIG. 5) is/are opened in step 72, allowing the chemicals to adequately mix with the water in the mixing chamber 32. The control unit 12 subsequently cycles through each zone in steps 74 through 82 to ensure that all zones are adequately treated. The chemical treatment routine preferably operates as follows: the control unit 12 activates an initial zone, by sending an activation signal to all sprinkler heads 26 in that zone, in step 76, for a specified period of time 78. After the predetermined time has passed, the control unit 12 deactivates that zone in step 80. Each time the process repeats, the zone constant, 'z', is incremented by one (1) in step 74 until the zone constant equals the preprogrammed zone constant "m", in step 82, where 'm' represents the number of zones specified by the user during installation. After the control unit 12 completes the chemical treatment schedule, the control unit 12 closes all chemical control valves 108 attached to the mixing chamber 32 (see FIG. 5) in step 84. Finally, the chemical treatment routine ends in step 70 and preferably repeats the process beginning with step 54. System 10 thus continuously monitors saturation levels in the soil and implements a chemical treatment schedule as desired.

The present invention also monitors the system 10 for failures. For example, the system monitors for any sprinkler head 26 failures, as diagrammed in FIG. 4. A failure check routine begins in step 86. The control unit 12 sets an initial state and assigns the zone value to zero in step 88. The control unit 12 cycles through each zone, incrementally in step 90. The control unit 12 transmits a check signal to the sprinkler heads 26 of that particular zone in step 92. After receiving a return check signal from all sprinkler heads 26 in step 94, the control unit 12 analyzes the information and decides whether the sprinkler heads 26 are functioning correctly in step 96. If the control unit 12 decides that all sprinkler heads 26 are functional, the control unit logs the time and date of the status check as successful for that zone and stores the log in the control unit 12 memory in step 98. Each log preferably may be retrieved by the user at a later time or stored as cumulative information for user defined reports. The control unit 12 continues the failure check until all zones, 'm', have been checked in step 100. If all zones have not been checked, then the control unit 12 cycles to the next zone in step 90. After all zones have been checked, the sprinkler head check routine finally ends in step 102. The sprinkler head check may be programmed to repeat the check routine starting at step 86, or, alternatively, the control unit 12 may be programmed to check the sprinkler heads 26 at regularly defined intervals.

Figure 4:
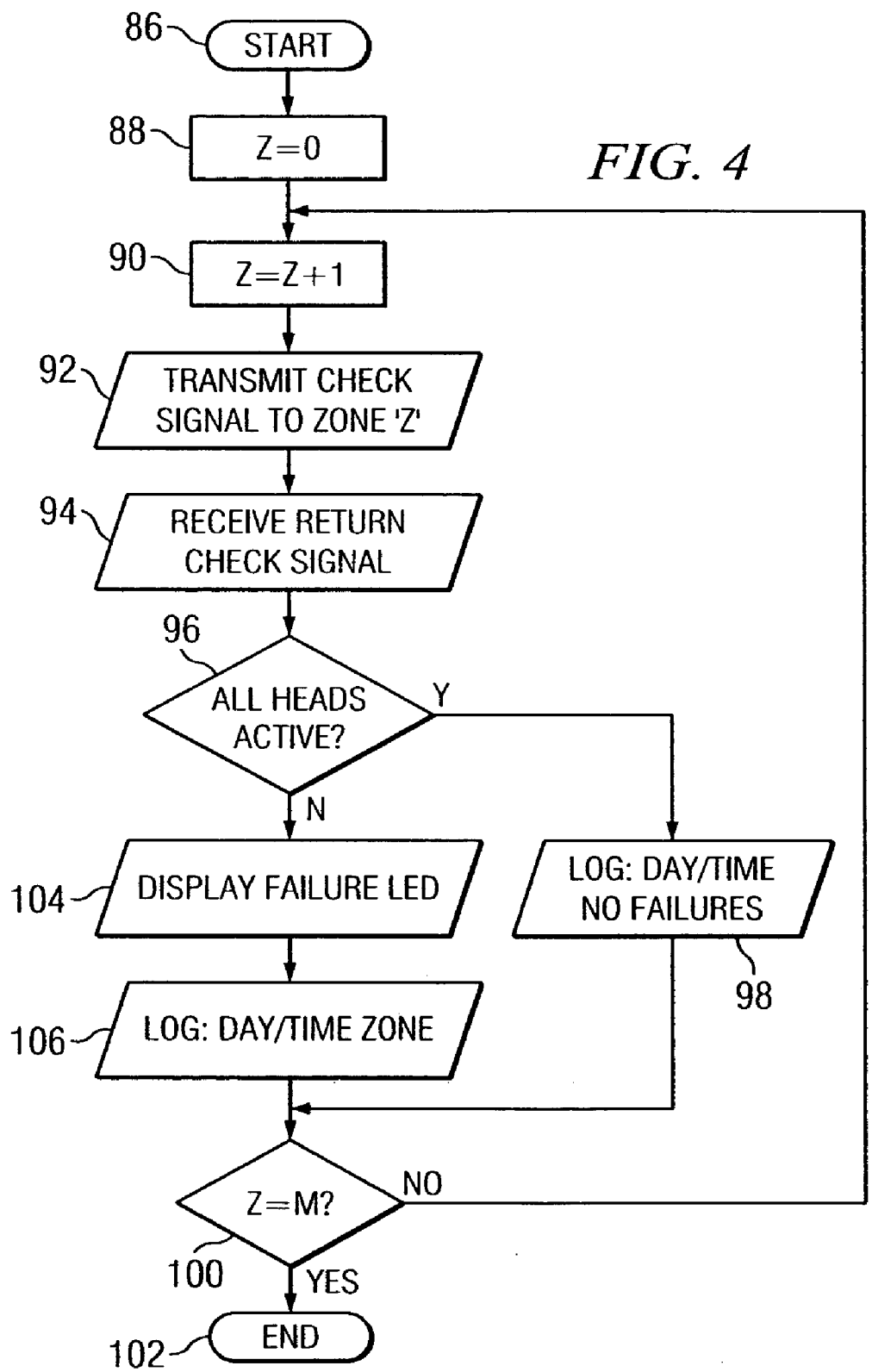
FIG. 4 is a flow chart showing operating steps of the control unit of the present invention to check for sprinkler head functionality.

Still referring to FIG. 4, if the status check in step 96 reveals at least one non-functional or inactive sprinkler head 26, then an LED failure display on the control unit 12 (not shown) will be initiated in step 104. A time and date log of the failure will be stored in the control unit 12 memory, along with the location of the failed device in step 106. The log may be retrieved by the user at a later time or stored as cumulative information for user defined reports at a later time. Again, the control unit 12 continues the failure check until all zones, 'm', have been checked in step 100. If all zones have not been checked, then the control unit 12 cycles to the next zone in step 90. After all zones have been checked, the sprinkler head check routine finally ends in step 102. The sprinkler head check may be programmed to repeat the check routine starting at step 86, or, alternatively, the control unit 12 may be programmed to check the sprinkler heads 26 at regularly defined intervals.

Figure 5:
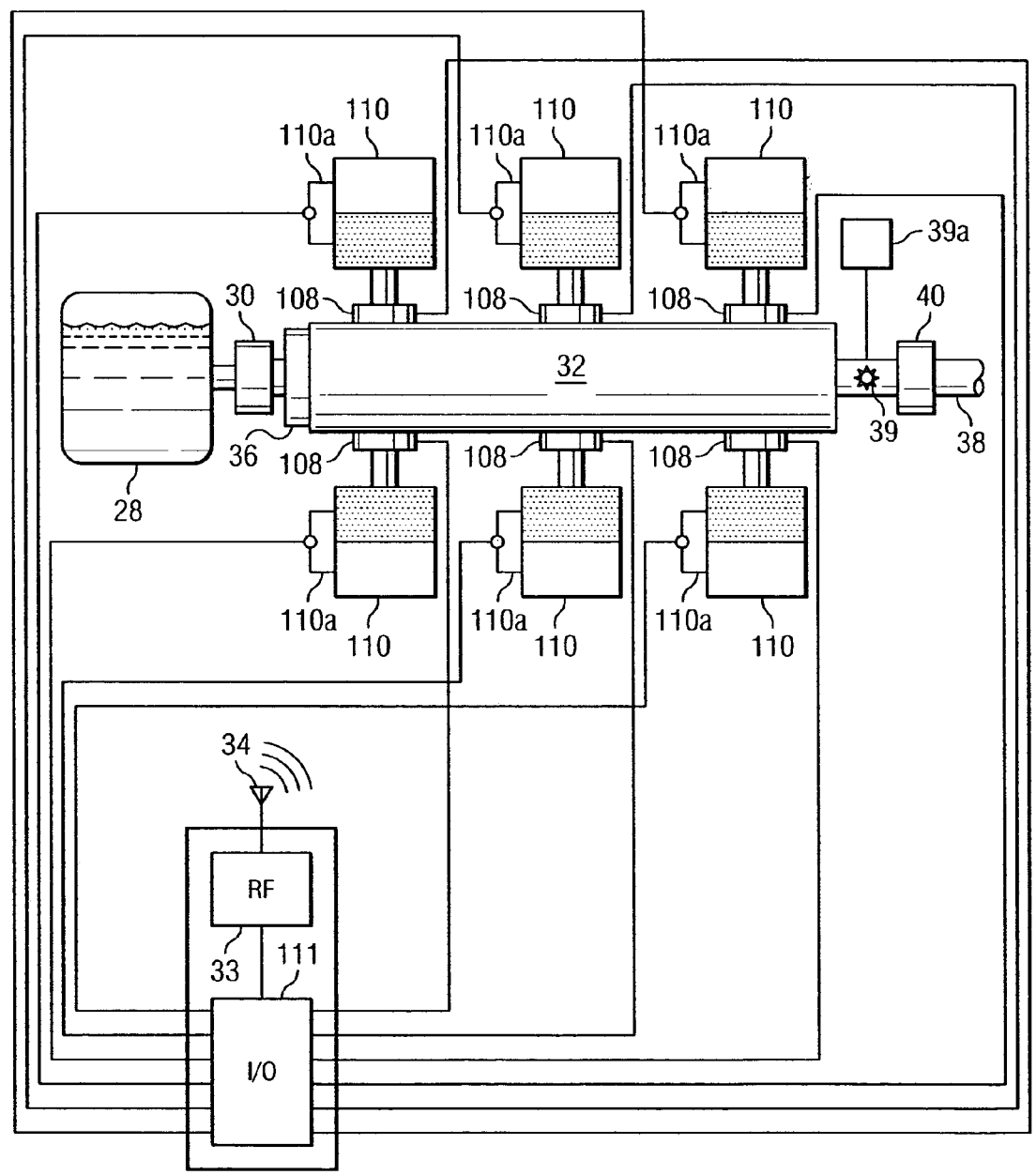
FIG. 5 is an illustration of a preferred mixing chamber of the present invention.

Referring now to FIG. 5, the control unit 12 also controls the mixing chamber 32 and the amount of chemical released into the system 10. The mixing chamber 32 is connected to the water supply 28 by way of the inlet connector 30 and is preferably adapted to receive several chemicals. The amount of chemical released into the mixing chamber 32 is controlled by individual chemical canister control valves 108. The control unit 12 controls each chemical canister control valve 108, which subsequently regulates the amount of chemical released from individual chemical canisters 110, via an input/output controller 111.

A user may choose to program the control unit 12 to regulate the amount of chemical released to the mixing chamber 32 for a specified chemical treatment schedule (as described in conjunction with FIG. 3). The user may select chemicals such as nitrogen, phosphorus and/or potassium based fertilizers, herbicides and/or pesticides to be stored in respective ones of chemical canisters 110. Each chemical canister 110 is preferably a self-contained, reusable container that is easily replenishable and protects the user from unnecessary chemical exposure. Moreover, the chemical canisters 110 are preferably stored underground, thus, further preventing user exposure. Chemical canisters 110 dispense chemicals in a preferred manner as will be described further herein and have respective sensors 110a that monitor the quantity of chemical stored in each chemical canister. When a sensor 110a measures a chemical level below a desired amount, the sensor sends a "low chemical" signal to the input/output controller 111. The input/output controller 111, in turn, sends a signal to the control unit 12 alerting the user of the low chemical amount. Although FIG. 5 depicts six chemical canisters 110, it should be understood by those skilled in the art, that the number of chemical canisters 110 may be varied to customize the system 10.

The pressure regulator 36 maintains the fluid pressure so that the pressure conforms with a given design requirement for the mixing chamber 32 as well as the underground zone pipelines 44. Thus, an appropriate amount of chemical and water mix in mixing chamber 32 and eventually released into the main water line 38 by way of an outlet connector 40, while still maintaining uniform fluid pressure throughout the system 10. The mixing chamber 32 may further be designed to be an energy efficient system. The mixing chamber 32 strategically may include at least one micro-hydro electric generator 39 in the fluid flow path as shown in FIG. 5. The micro-hydro generator 39 harnesses inherent energy in fluid flowing through the mixing chamber 32 before it exits through outlet connector 40. The micro-hydro electric generator 39 stores the captured energy in a rechargeable battery 39a to operate the mixing chamber 32. The stored energy may be used, for example, to power an optional chamber controller card (not shown) and the transceiver 33. The optional chamber controller card and transceiver 33 facilitate wireless communication, if desired, from and to the control unit 12 via an antenna 34.

Figure 6:
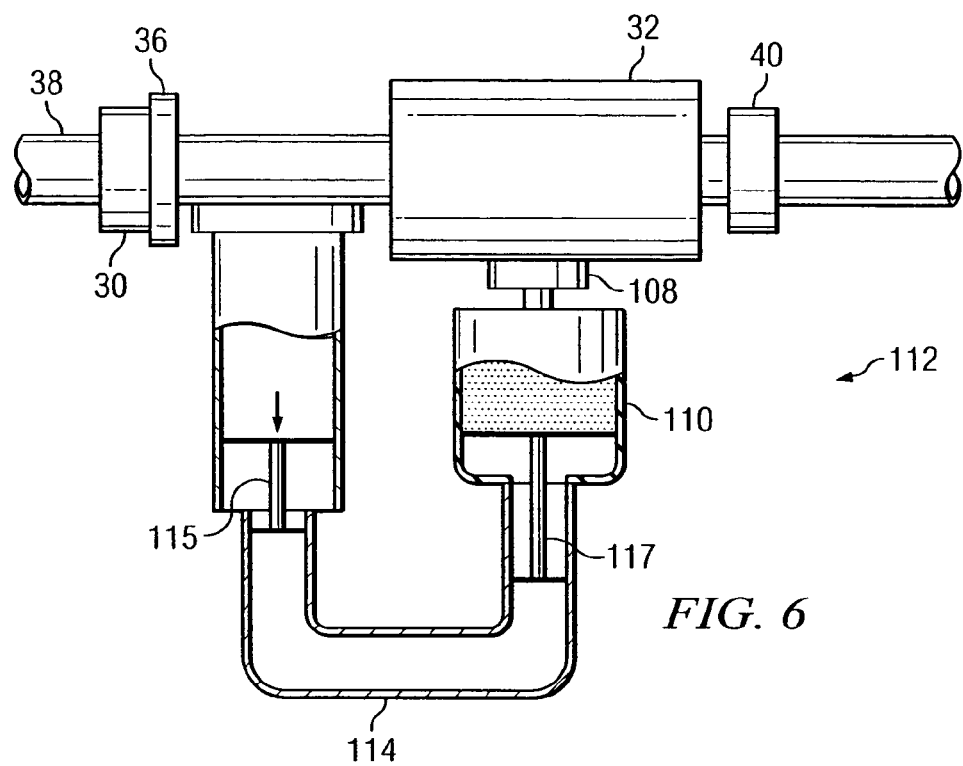
FIG. 6 is a somewhat schematic diagram of a preferred pressure-controller for the mixing chamber of the present invention.

Now referring to FIG. 6, each chemical canister 110 of the mixing chamber 32 may be adapted to utilize a fluid pressure control or intensifier system 112 shown somewhat schematically for one of the canisters 110, in FIG. 6. The fluid pressure control system 112 utilizes pressure from source 28, for example, to control the chemical pressure within a chemical canister 110. For example, in a preferred embodiment, the input water supply pressure (at the inlet connector 30) is transferred to the chemical canister 110 by way of an intensifier 114 comprising differential diameter piston assemblies 115 and 117, as shown. The intensifier 114 is operable to dispense the chemical in the chemical canister 110 through a variable position metering control valve 108 to control the flow rate of the chemical into the mixing chamber 32. Alternatively, fluid flow into the mixing chamber 32 may be controlled by using a conventional open/close valve for the valve 108 while selecting the diameters of the piston assemblies 115 and 117 of intensifier 114 to provide optimized fluid pressure in the chemical canister 110. In another alternative embodiment, both methods may be utilized to complement the other method to provide optimized fluid control. In any case, the chemical is control-released into the mixing chamber 32 and mixed with a steady flow of water through the mixing chamber, producing a controlled concentration of fertilizer, herbicide, pesticide or other chemical. Thus, the, intensifier 114 provides an efficient energy transfer into the chemical canister 110 to provide a preferred flow rate of chemical. Finally, after chemicals and water mix in the mixing chamber 32, the liquid mixture is released to the outlet connector 40.

Figure 7:
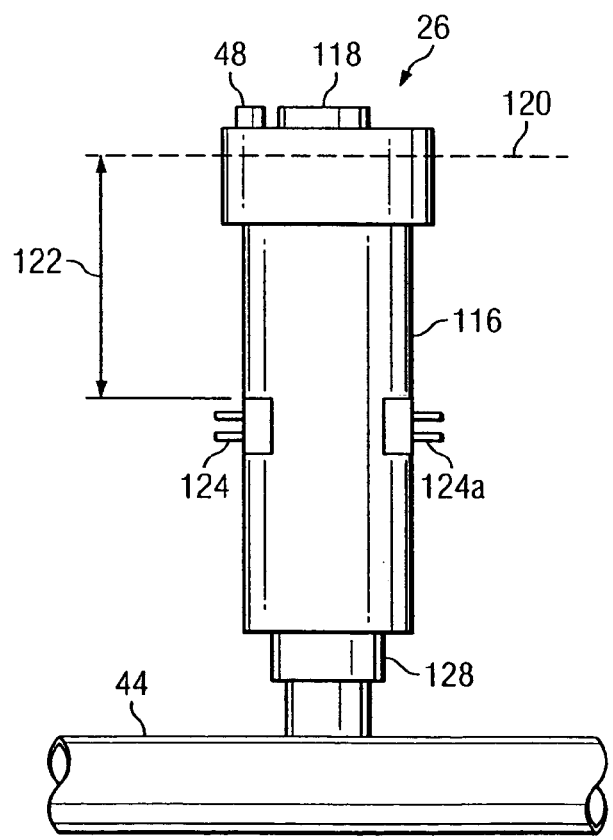
FIG. 7 is a view of a preferred sprinkler head of the present invention.

As shown in FIG. 7, the sprinkler head 26 preferably has two main components, a sprinkler housing 116 and a pop-up sprinkler nozzle 118. Sprinkler housing 116 is preferably situated substantially under the soil line 120 to a sensor depth 122. The sprinkler housing 116 houses a sprinkler controller 123 (see FIG. 8) that monitors and gathers information from a water saturation sensor 124 and from an optional chemical saturation sensor 124a. The sprinkler head 26 preferably connects to the underground zone pipeline 44 via an inlet connector 128 which is preferably connected to a control valve 130 disposed in the housing 116. Control valve 130 (see FIG. 8) controls the flow of water through the sprinkler head 26.

Figure 8:
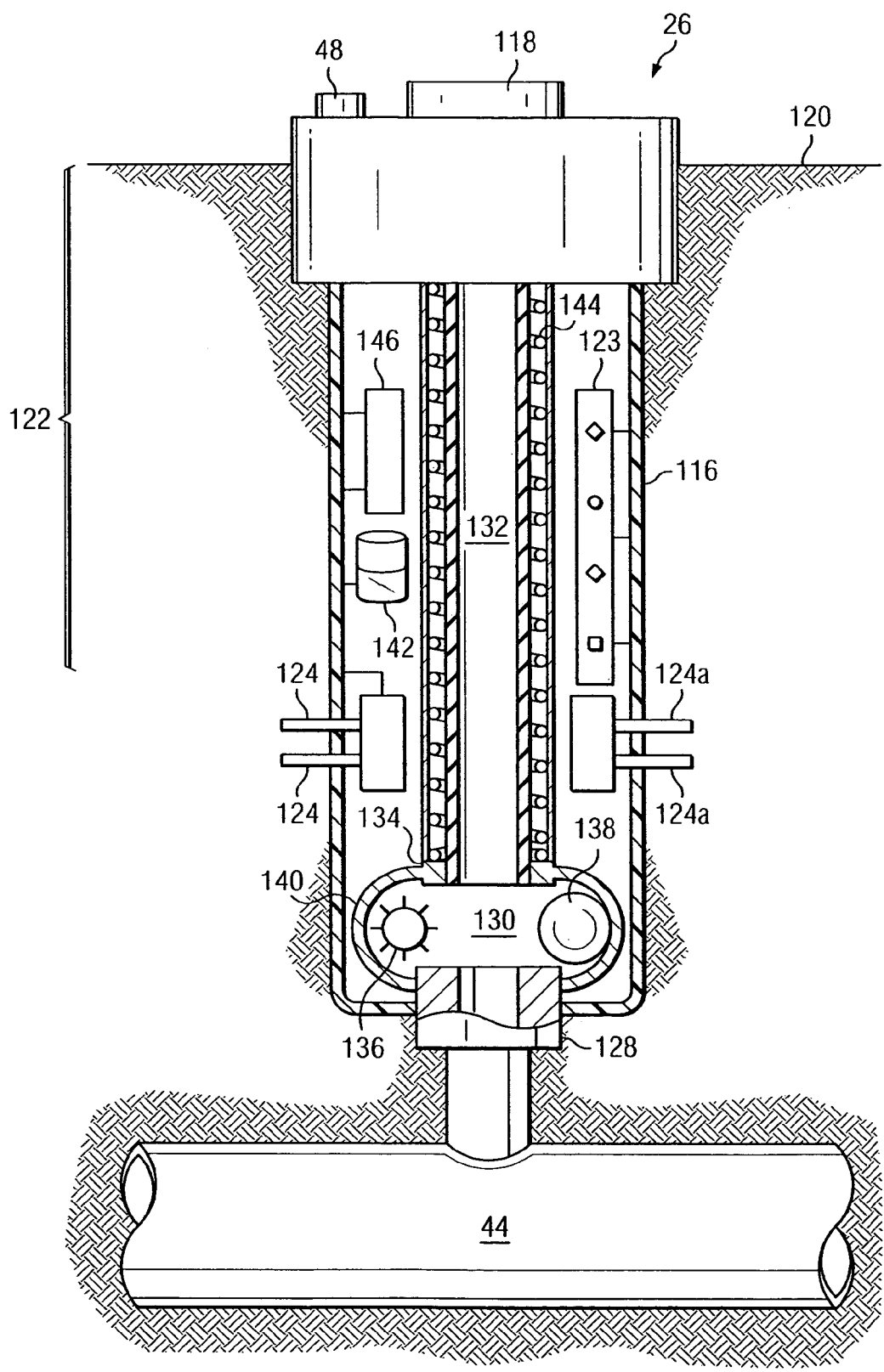
FIG. 8 is a schematic diagram of the components of the sprinkler head of the present invention.
Figure 10A:
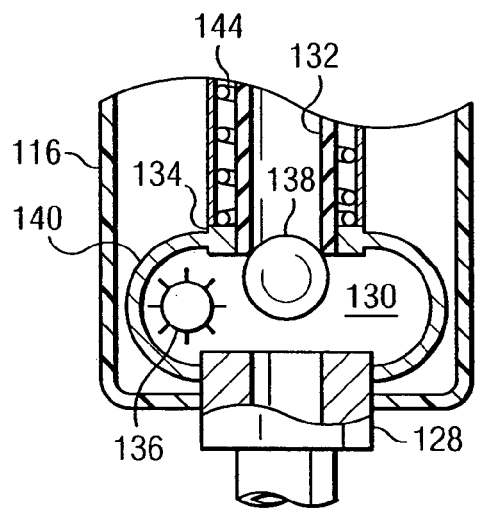
FIG. 10A is a schematic diagram of a sprinkler head control valve in a closed position.
Figure 10B:
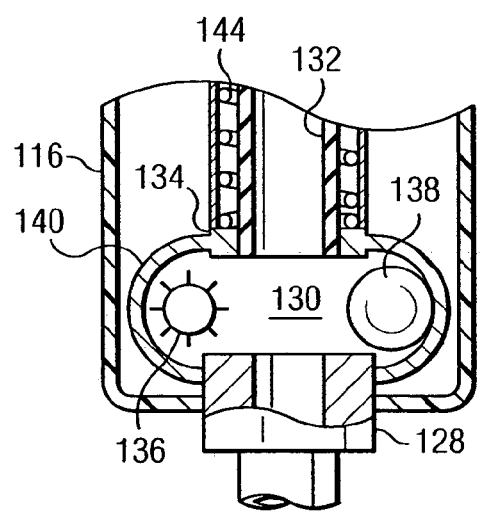
FIG. 10B is a diagram similar to FIG. 10A showing the control valve in an open position.

Referring to FIG. 8, the water saturation sensor 124 monitors the water saturation levels in the sprinkler head's 26 immediate area. If a sprinkler controller 123 determines that saturation levels are inadequate, it will transmit a wireless message via a suitable transceiver 146 and antenna 48 to the control unit 12 with that information. The control unit 12 will, in turn, initiate the flow of liquids to the depleted zone and send an activation signal to each sprinkler head 26 in that zone via transceiver 12b and antennas 19 and 48. Each sprinkler head 26 will then determine whether to move control valve 130 to the closed position as depicted in FIG. 10A or move the control valve to an open position as depicted in FIGS. 8 and 10B, based on the individual sprinkler head's requirements.

Similarly, the chemical saturation sensor 124a monitors the chemical saturation levels in the sprinkler head's 26 immediate area. If the sprinkler controller 123 (see FIG. 8) determines that a chemical saturation level is inadequate, it will transmit a wireless message via transceiver 146 and antenna 48, to the control unit 12 with that information. The control unit 12 will, in turn, initiate the flow of chemical to the depleted zone and send an activation signal to each sprinkler head 26 in that zone via transceiver 12b and antennas 19 and 48. Sprinkler head 26 may be configured to close control valve 130 or open the control valve based on the individual sprinkler head's requirements or distribute the chemicals to all sprinkler head in that zone depending on the user's predetermined chemical treatment schedule and/or customized plan.

Referring further to FIG. 8, the control valve inlet connector 128 is in fluid flow communication with a water delivery chamber 132 via a water delivery chamber inlet fitting 134. A preferred embodiment of control valve 130 includes, for example, a micro-hydro electric generator 136, a plunger ball 138 and an electromagnet 140. Although the micro-hydro electric generator 136, as depicted somewhat schematically, is shown in the flow path of water in the control valve 130, the micro-hydro electric generator may, alternatively, be placed elsewhere to capture the flow of water between the control valve inlet connector 128 and the water delivery chamber 132. A rechargeable battery 142 is operably connected to generator 136 and stores the energy generated thereby for later use.

Plunger ball 138 controls the flow of fluid from the control valve 130 to the water delivery chamber 132 by blocking the flow path formed by the fitting 134, as later described in conjunction with FIGS. 10A and 10B. The plunger ball 138 may be formed of various magnetic materials, but is preferably a rubber coated ferric ball. The water delivery chamber 132 connects to the pop-up sprinkler nozzle 118 and to provide water distribution above the soil line 120. A sprinkler retraction spring 144 is operable to bias the pop-up sprinkler nozzle 118 to a retracted position which may be below the soil line 120 when not in operation for safety reasons. The pop-up sprinkler nozzle 118 is preferably designed to lift above the soil line 120 only when water pressure in the water delivery chamber 132 surpasses the bias force of the retraction spring 144.

Figure 9:
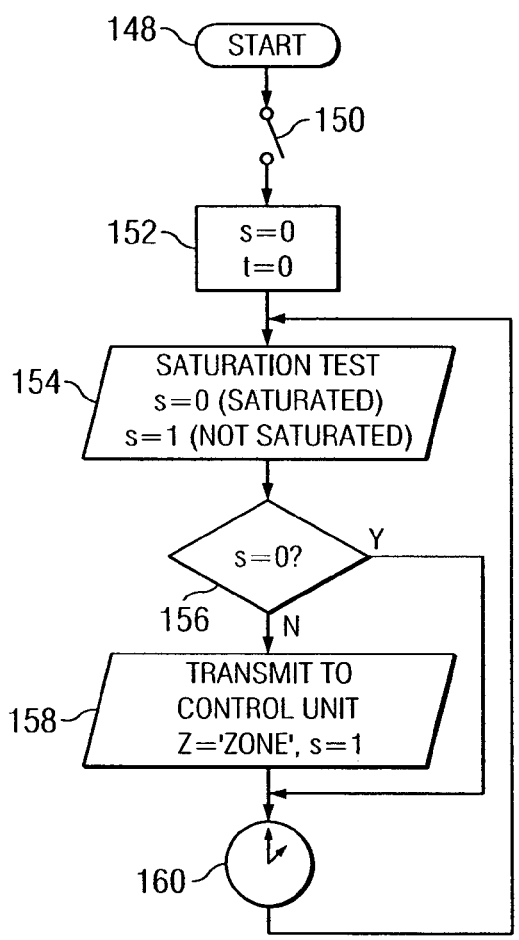
FIG. 9 is a flow chart showing operating steps for a preferred sprinkler head saturation monitoring of the present invention.

Each sprinkler head 26 includes a radio frequency transceiver 146 to wirelessly communicate with the control unit 12 to control the flow of fluid. Each sprinkler head 26 optionally includes has a magnetic shield (not shown) that protects components of the sprinkler head, such as the antenna 48 and transceiver 146, from any electrical interference with the electromagnet 140. A more detailed discussion of the saturation monitoring of the present invention is illustrated in FIG. 9 in flow chart form. Each sprinkler head 26 continuously monitors the water saturation level in its immediate area if, in step 148, a temperature switch 150 is closed. Switch 150 may be located, for example, on any component of the system 10 exposed to the outdoors, and is preferably initiated, or closed, when the ambient temperature is above freezing. The present invention, thus, allows the system 10 to operate only when temperatures are above freezing. The sprinkler head 26 initially sets the saturation variable (s) to zero at time (t) zero in step 152. The saturation test in step 154 assigns a state to the saturation variable according to whether the sprinkler head 26 senses an adequate saturation level in step 154.

When a sprinkler head 26 detects that the ground is not saturated, the sprinkler head 26 will send that result to the control unit 12 in step 158, requesting water to be delivered to a particular zone. Because each zone may have multiple sprinkler heads 26, each sprinkler head independently controls its own control valve 130 and decides whether it will open or close its valve based on the results of the water saturation test at step 154. If the water saturation sensor 124 reads that the ground is saturated, the saturation variable (s) will remain zero and the sprinkler head 26 will run a continuous loop of water saturation monitoring, after some a specified time delay in step 160, so long as switch 150 remains closed.

The present invention may be optionally configured for chemical saturation monitoring following the same convention as set forth in FIG. 9, where each sprinkler head 26 continuously monitors the chemical saturation level in its immediate area. The sprinkler head 26 in step 148 initiates a continuous chemical saturation test if temperature switch 150 is closed. The user may optionally program the invention to check chemical levels only at predetermined time intervals. The sprinkler head 26 initially sets the saturation variable (s) to zero at time (t) zero in step 152. The saturation test in step 154 assigns a state to the saturation variable according to whether the sprinkler head 26 senses an adequate saturation level in step 154. When the sprinkler head 26 detects that the ground is not saturated with a certain chemical, the sprinkler head 26 will send that result to the control unit 12 in step 158, requesting that chemical to be delivered to a particular zone. Because each zone may have multiple sprinkler heads 26, each sprinkler head independently controls its own control valve 130 and decides whether it will open or close its valve based on the results of the chemical saturation test at step 154. If the chemical saturation sensor 124 reads that the ground is saturated, the saturation variable (s) will remain zero and the sprinkler head 26 will run a continuous loop of chemical saturation monitoring, after some a specified time delay in step 160, so long as switch 150 remains closed.

FIG. 10A illustrates the control valve 130 in an engaged or closed position. When the electromagnet 140 is not energized the plunger ball 138 is operable to move to the valve closed position, blocking the flow of fluid to the water delivery chamber 132. The surging fluid flow through the valve body formed at least in part by magnet 140 and fitting 134 biases the plunger ball 138 into engagement with a valve seat formed by the delivery chamber inlet fitting 134, blocking the flow of fluid into the water delivery chamber 132. Thus, the sprinkler head 26 will not allow fluid to flow to the soil surface.

FIG. 10B shows the control valve 130 in a valve open position. When in the valve open position, the electromagnet 140 is energized, pulling the plunger ball 138 away from the valve seat formed by the water delivery chamber inlet fitting 134. The optional retention partition also helps ensure that the plunger ball 138 remains clear from the water delivery chamber inlet fitting 134. Fluid is allowed to freely flow through the water delivery chamber inlet fitting 134 and, subsequently, into the water delivery chamber 132. Thus, sprinkler head 26 allows water to flow to the soil surface, delivering water and/or chemicals to the soil. When the fluid is freely flowing into the water delivery chamber 132, the micro-hydro generator 136 converts kinetic energy from the water to potential energy. This energy is stored in rechargeable battery 142 and/or supplements any energy required to supply the sprinkler head 26. The electromagnet 140 is preferably also adapted to utilize energy stored in a preferred lithium rechargeable battery 142.

Although preferred embodiments of an automated irrigation and chemical treatment system have been described in detail herein, it will be appreciated that the present invention is discussed in detail herein. It will further be appreciated that the present invention provides may applicable inventive concepts that can be embodied in a wide variety of specific contexts. For example, while the description has principally referenced an irrigation and chemical treatment system for a field, it is to be understood that the system may also be utilized for smaller scaled gardens and lawns as well as mass producing plantations and the like. The specific embodiments discussed herein are merely illustrative of specific ways to make and use the invention, and do not delimit the scope of the invention. Those skilled in the art will recognize that various substitutions and modifications may be made to the invention without departing from the scope and spirit of the appended claims.

What is claimed is:

1. An automated earth irrigation and chemical treatment system, comprising:
   a control unit;
   a mixing chamber adapted to communicate with the control unit, wherein the mixing chamber further comprises:
     a body adapted to provide for flow of fluids therethrough;
     an inlet valve connected to a water supply and the body; and
     at least one chemical canister connected to the body;
   a network of pipes adapted to distribute liquid from the mixing chamber, wherein the network of pipes further comprises:
     pipe control valves adapted to control the flow of liquid to selected areas of the network of pipes and further adapted to communicate with the control unit; and
     plural spaced apart sprinkler heads adapted to communicate with the control unit, wherein each sprinkler head further comprises:
       a connector adapted to connect to the network of pipes;
       a sprinkler head control valve;
       a spray nozzle adapted to spray fluid from the sprinkler head; and
       a water saturation sensor connected to the sprinkler head.

2. The automated irrigation and chemical treatment system of claim 1, wherein the sprinkler head further comprises a chemical saturation sensor connected to the sprinkler head.

3. The automated irrigation and chemical treatment system of claim 1, wherein the mixing chamber is adapted to wirelessly communicate system information with the control unit.

4. The automated irrigation and chemical treatment system of claim 1, wherein the pipe control valves are adapted to wirelessly communicate system information with the control unit.

5. The automated irrigation and chemical treatment system of claim 1, wherein at least selected ones of the sprinkler heads are adapted to wirelessly communicate system information with the control unit.

6. The automated irrigation and chemical treatment system of claim 1, wherein each sprinkler head farther comprises a micro-hydro electric generator adapted to capture energy from the fluid flow in the sprinkler head.

7. The automated irrigation and chemical treatment system of claim 6, wherein each sprinkler head further comprises a rechargeable battery to store the energy captured from the micro-hydro electric generator.

8. The automated irrigation and chemical treatment system of claim 1, wherein each sprinkler head further comprises a water delivery chamber farther comprising:
    an inlet fitting;
    a closure member adapted to restrict fluid flow through the sprinkler head; and
    an electro-magnet adapted to control movement of the closure member.

9. The automated irrigation and chemical treatment system of claim 8, wherein the closure member is a coated, ferric ball.

10. The automated irrigation and chemical treatment system of claim 1 including:
    a micro-hydro electric generator disposed in the system between the water supply and the network of pipes.

11. An automated earth irrigation and chemical treatment system, comprising:
    a control unit;
    a mixing chamber adapted to communicate with the control unit, wherein the mixing chamber further comprises:
        a body adapted to provide for flow of fluids therethrough;
        an inlet valve connected to a water supply and the body; and
        at least one chemical canister connected to the body;
    a network of pipes adapted to distribute liquid from the mixing chamber, wherein the network of pipes further comprises:
        pipe control valves adapted to control the flow of liquid to selected areas of the network of pipes and further adapted to communicate with the control unit; and
        plural spaced apart sprinkler heads adapted to communicate with the control unit, wherein each sprinkler head further comprises:
            a connector adapted to connect to the network of pipes;
            a sprinkler head control valve;
            a spray nozzle adapted to spray fluid from the sprinkler head;
            a chemical saturation sensor connected to the sprinkler head; and
            a closure member adapted to restrict fluid flow through the sprinkler head.

12. The automated irrigation and chemical treatment system of claim 11, wherein the mixing chamber is adapted to wirelessly communicate system information with the control unit.

13. The automated irrigation and chemical treatment system of claim 11, wherein the pipe control valves are adapted to wirelessly communicate system information with the control unit.

14. The automated irrigation and chemical treatment system of claim 11, wherein at least selected ones of the sprinkler heads are adapted to wirelessly communicate system information with the control unit.

15. The automated irrigation and chemical treatment system of claim 11, wherein each sprinkler head farther comprises a micro-hydro electric generator adapted to capture energy from the fluid flow in the body.

16. The automated irrigation and chemical treatment system of claim 15, wherein each sprinkler head further comprises a rechargeable battery to store the energy captured from the micro hydro electric generator.

17. The automated irrigation and chemical treatment system of claim 11, wherein the sprinkler head further comprises a water saturation sensor.

18. The automated irrigation and chemical treatment system of claim 11, further comprises an electro-magnet adapted to control movement of the closure member.

19. The automated irrigation and chemical treatment system of claim 11 including:
    a fluid pressure intensifier connected to the chemical canister operable to control flow of chemical from the chemical canister to the mixing chamber.

20. The automated irrigation and chemical treatment system of claim 11 including:
    a flow control valve interposed between the mixing chamber and the chemical canister.

21. The automated irrigation and chemical treatment system of claim 19, wherein the pressure intensifier includes at least one differentiated piston assembly.

22. The automated irrigation and chemical treatment system of claim 19, wherein the pressure intensifier is operably connected to the water supply to receive pressure water therefrom.

23. A sprinkler head apparatus comprising:
    a housing;
    an inlet connector connected to the housing;
    a control valve operably connected to the inlet connector;
    a spray nozzle disposed in the housing and adapted to spray fluid from the sprinkler head;
    a water saturation sensor; and
    a chemical saturation sensor.

24. The sprinkler head apparatus of claim 23, wherein the sprinkler head further comprises a transceiver to wirelessly communicate sprinkler head information with a remote control unit.

25. The sprinkler head of claim 23, wherein the control valve further comprises a closure member adapted to restrict fluid flow through the sprinkler head.

26. The sprinkler head apparatus of claim 25, wherein the control valve further comprises an electro-magnet adapted to control movement of the closure member.

27. The sprinkler head apparatus of claim 26, wherein the closure member is a coated ferric ball.

28. The sprinkler head apparatus of claim of claim 23, wherein the sprinkler head further comprises a micro-hydro electric generator.

29. The sprinkler head apparatus of claim 28, wherein the sprinkler head further comprises a rechargeable battery to store the energy captured from the micro-hydro electric generator.

30. A sprinkler head apparatus comprising:
an inlet connector;
a control valve connected to the inlet connector;
a spray nozzle adapted to spray fluid from the sprinkler head;
a closure member adapted to restrict fluid flow through the sprinkler head;
an electro-magnet adapted to control movement of the closure member;
a transceiver;
a water saturation sensor; and
a chemical saturation sensor.

31. The sprinkler head apparatus of claim 30, wherein the closure member is a rubber coated ferric ball.

32. The sprinkler head apparatus of claim of claim 30, wherein the sprinkler head further comprises a micro-hydro electric generator.

33. The sprinkler head apparatus of claim 32, wherein the sprinkler head further comprises a rechargeable battery to store the energy captured from the micro-hydro electric generator.

34. A method of irrigating and distributing chemicals to a field comprising:
parsing a field into zones;
providing a water and chemical distribution system including plural spaced apart sprinkler heads and a control unit;
programming desired water saturation levels for each zone into the control unit; and
distributing water to each zone according to the programmed water saturation level for each zone, wherein distributing water further comprises:
 (a) measuring the water saturation level at each sprinkler head in a given zone; and
 (b) if a water saturation level is below the programmed water saturation level at any given sprinkler head, then activating the given zone wherein activation of the given zone allows water to be distributed only through the sprinkler heads that measured reduced water saturation levels in the given zone, wherein the step of allowing water to be distributed further comprises:
  opening a valve at the given sprinkler head to allow water to flow through the sprinkler head; and
  closing the valve when the water saturation level is at an acceptable level;
programming a desired chemical distribution schedule for each zone into the control unit; and
distributing chemicals according to the chemical distribution schedule.

35. The method set forth in claim 34, further including the repeating steps (a)-(b).

36. A method of irrigating and distributing chemicals to a field comprising:
parsing a field into zones;
providing a water and chemical distribution system including plural spaced apart sprinkler heads and a control unit;
programming desired chemical saturation levels for each zone into the control unit; and
distributing chemicals to each zone according to the programmed chemical saturation level for each zone, wherein distributing the chemical further comprises:
 (a) measuring the chemical saturation level at each sprinkler head in a given zone; and
 (b) if a chemical saturation level is below the programmed chemical saturation level at any given sprinkler head within a zone, then activating all sprinkler heads within the given zone, wherein the step of activating all sprinkler heads further comprises:
  opening a valve at the given sprinkler head to allow chemicals to flow through the sprinkler head; and
  closing the valve when the chemical saturation level is at an acceptable level.

37. The method set forth in claim 36, further including:
programming desired water saturation levels for each zone into the control unit; and
distributing water to each zone according to the programmed water saturation level for each zone, wherein distributing water further comprises:
 (a) measuring the water saturation level at each sprinkler head in a given zone; and
 (b) if a water saturation level is below the programmed water saturation level at any given sprinkler head, then activating the given zone wherein activation of the given zone allows water to be distributed only through the sprinkler heads that measured reduced water saturation levels in the given zone, wherein the step of allowing water to be distributed further comprises:
  opening a valve at the given sprinkler head to allow water to flow through the sprinkler head; and
  closing the valve when the water saturation level is at an acceptable level.

38. The method set forth in claim 36, further including the repeating steps (a)-(b).

* * * * *